Dec. 21, 1965

R. D. ERICKSON 3,225,353

APPARATUS FOR RECORDING

Filed Aug. 11, 1961

INVENTOR.
ROGER D. ERICKSON

BY

ATTORNEY.

3,225,353
APPARATUS FOR RECORDING
Roger D. Erickson, Littleton, Colo., assignor to Honeywell Inc., a corporation of Delaware
Filed Aug. 11, 1961, Ser. No. 130,808
9 Claims. (Cl. 346—109)

The present invention relates to apparatus for producing a record in the form of an image or trace which is immediately visible and usable and is accomplished in full view of the operator thereby providing rapid access to recorded information.

An object of the invention is to provide an improved method of recording having particular utility in multi-channel-oscillography and providing rapid trace appearance, and good contrast and stability.

Oscillographic recorders which produce immediately visible traces of electrical phenomena under observation are known in the prior art. One such form of recording oscillograph is described in United States Letters Patent No. 2,580,427, granted to C. A. Heiland on January 1, 1952. Another form of such a recording oscillograph is disclosed in the application for United States patent, filed on September 8, 1958 by R. S. Kampf and bearing Serial No. 759,675, issued as Patent 3,066,299 on November 27, 1962. Such oscillographs are used in scientific, military and medical fields. In many such applications, rapid access to the recorded information is an essential requirement.

A unique aspect of the invention described in Patent 2,580,427 is the realization that the use of a recording radiation beam, principally in the invisible portion of the spectrum, when matched with a recording paper coated with an emulsion primarily responsive to such radiations, permits recording of multiple high, as well as low, frequency phenomena, which recording becomes immediately visible in ordinary room light, without the delay encountered in the prior art of so-called wet-process development.

The use of such recording paper, referred to in the art as print-out recording paper, gives an immediate image or trace corresponding to the deflections of the recording beam of radiation when the recording beam and recording paper are moving comparatively slowly. At higher writing speeds or higher paper transport speeds, a "latent" image or trace is recorded, as in developing-out recording papers requiring wet-process development. This latent recorded image can be "latensified" and thereby made to appear, by exposing it to the room light. The time of such secondary exposure required to make the trace visible varies in accordance with the speed of writing and paper transport speeds, but ordinarily is no longer than about a minute. The appearance of the latent image through secondary exposure is known in the art as "latensification."

For many applications, a latensification time delay of one minute, although extremely short when compared to the time required previously for wet-process development, cannot be tolerated if the full potential of oscillographic recorders of the type disclosed in Patent 2,580,427 and in Patent 3,066,299, aforementioned, is to be realized. In applications involving testing and experimenting, for example, the oscillograph is used for monitoring purposes. Often, corrective action must be taken within a second or two if a significant change occurs in one of the monitored variable. The one-minute latensification time could not be tolerated under such conditions. Additionally, if the requirements are such that the paper transport speed is at the rate of several feet per second, an awkward paper-handling problem tends to result if all of the resulting length of paper has to be latensified by exposure to the room lighting for a period of one minute before the trace becomes visible.

A specific object of the present invention is to provide an improvement in the latensification process which results in trace appearance at least ten times faster than with conventional oscillograph arrangements, as described above. With such improved or forced latensification, the paper will produce a high visible trace within one second at record travel speeds in excess of eight inches per second and at any frequency resolvable at the speed, or envelope studies if in excess of the resolvable frequency.

Another object of the present invention is to provide such forced latensification in a convenient and inexpensive manner without heat, involving radiation to which the recording paper or material is particularly sensitive. The use of heat to desensitize the paper and permit forced latensification is known and has certain disadvantages. The use of hot platens or heat sources to heat the paper from 70° C. to 200° C. involves an expensive piece of additional equipment to an oscillographic recorder. Significant amounts of additional electrical power are required. The oscillograph operator is subject to the hazard of being burned. The large amounts of heat given off by a hot platen or heat source can produce very uncomfortable ambient temperatures for the oscillograph operator or may require the use of significant amounts of additional air conditioning. The heat radiation involves wavelengths to which the print-out papers are not sensitive.

In accordance with the present invention, latensification is produced by radiations to which the recording material is particularly sensitive. By first exposing the recording paper or material for a short time to a low intensity state of radiation, it has been found that a high intensity latensifying radiation defining the same wavelengths may be used with a minimum of fogging. If the low intensity exposure is avoided an excessive fogging or darkening of the background of the paper results. By way of example and not limitation, radiation between 3000 A. and 4000 A., in the range of wavelengths to which the paper is particularly sensitive, is effective in desensitizing the background of the recording paper or material. The exposure of the paper to this radiation desensitizes the background or areas of the paper on which no latent images have been recorded. The exposure times required for desensitization range from a fraction of a second to several seconds depending on the degree of desensitization desired. Following the low intensity exposure, the paper can be exposed to high intensity radiation between 3000 A. and 4000 A. The high intensity radiation latensifies the latent image very rapidly and produces a minimum darkening of the background because the background has been desensitized. In the prior art, the use only of high intensity radiations between 3000 A. and 4000 A. for latensification was not permissible because these radiations would also produce excessive darkening or fogging of the background.

A better understanding of the present invention may be had from the following detailed description when read in connection with the accompanying drawings in which.

Figure 1:
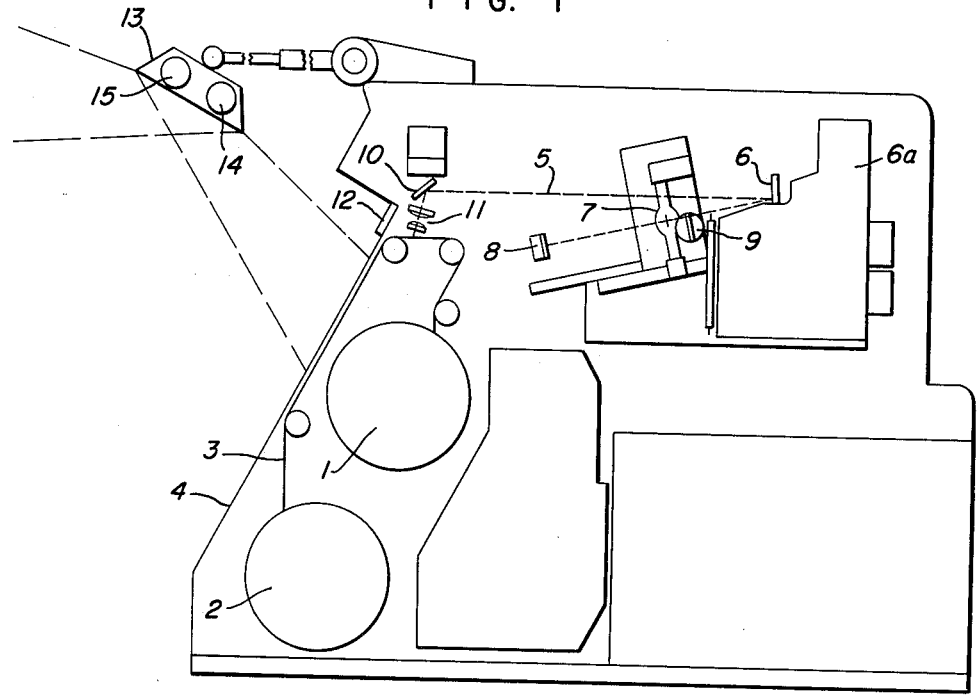
FIG. 1 is a diagrammatic or schematic view in vertical cross-section of a form of oscillograph embodying the novel latensifying apparatus of the present invention.

The oscillographic recorder illustrated in FIGURE 1 includes a compartment containing a supply reel 1 and a take-up reel 2 for the roll of sensitive recording paper or material 3. An electric motor, not shown, actuates these reels and is controlled by a suitable switch located on the front panel 4 of the oscillograph, as described in the aforementioned Kampf Patent 3,066,299. It will be apparent that in some cases the take-up reel 2 may not be necessary or desirable, and in such cases the take-up reel 2 may be dispensed with and the recording paper may be permitted to spill out over the table or panel on which the oscillograph is mounted and onto the floor.

In a recording-plane region between the reels, the recording paper is exposed to a recording beam 5 of radiation coming from the respective galvanometers, only one of which, here designated 6, is illustrated. Galvanometer 6 is shown mounted in a galvanometer magnet bank 6a which in practice ordinarily contains 12 galvanometers. It will be understood that any arbitrary number of such galvanometers may be provided; for example, there are three magnet banks containing a total of 36 galvanometers in one apparatus embodiment of the specific oscillograph on which the instant invention is drawn. Each such galvanometer has a small mirror, not shown, deflectable by the associated galvanometer movement, that will reflect the recording beam of radiation 5 from a source 7 to that portion of the sensitive recording paper 3 that is at the time at the recording-plane region between the reels.

The source 7 of radiation is a super-high-pressure mercury-vapor lamp enclosed in a quartz envelope and is operable to emit a beam of high intensity ultra-violet radiation. An example of such a lamp is the Osram lamp having a 0.012 inch diameter arc, which lamp is manufactured by the Osram Company in West Germany and is identified as their Model HBO–109. The beam of radiant energy from lamp 7 is concentrated by a collector lens, not shown, and is directed to a light-control mirror 8. The mirror 8 reflects the recording beam to a spot intensity control comprised by a filter 9 and through the galvanometer lens to the galvanometer mirror of the galvanometer 6. The galvanometer mirror reflects the radiant energy back through the galvanometer lens to a recording mirror 10, and through a recording lens 11 onto the recording paper 3 on the recording plane.

The oscillographic recorder is open at the front 4 thereby permitting direct access to the recording paper for loading, latensifying, and viewing. At the upper portion of the front 4 of the recorder, immediately adjacent the recording lens 11, is an amber-colored viewing window 12 for enabling the operator to observe the high-energy spots made by the beams of the radiant energy from the galvanometer mirrors during the positioning and recording operation. The window 12 protects the operator against direct exposure to the high energy ultra-violet recording beam.

In the form of the invention illustrated in FIG. 1, ambient room lighting and radiation produced by an electric lamp 13 cooperate to latensify the latent images on the recording paper as the latter is transported downwardly at the front 4 of the oscillograph. Lamp 13 is controlled by a starting switch and an on-off switch, neither of which is shown but which are provided on a panel on the front 4 of the oscillograph.

As noted hereinbefore, at higher frequencies, the recorded trace is not immediately visible. During recording at such higher frequencies, a latent image is created, which image appears after exposure to radiation in the visible spectrum. The appearance of this latent image through secondary exposure has been termed "latensification." An important aspect of the present invention involves the discovery that by first exposing the recording paper for a short time to a low intensity state of radiation including wavelengths to which the recording paper is particularly sensitive, high intensity radiation embracing the same wavelengths of radiation may be used to effect rapid latensification without fogging of the recording paper. In effecting rapid latensification by this improved method, proper placement of the latensifying lamp 13 is important, as explained hereinafter.

The latensifier lamp 13, as illustrated in FIG. 1, includes two fluorescent tubes, one tube, designated 14, providing so-called cool white light and the other tube, designated 15, providing so-called black light or high intensity ultra-violet radiation. Lamp 14 desirably may comprise a G.E. Type CW fluorescent lamp and lamp 15 may comprise a G.E. Type BL fluorescent lamp. In an operative embodiment of the invention lamp 14 comprised a G.E. Type F14T8CW and the lamp 15 comprised a G.E. Type F14T8BL.

For extremely rapid latensification, it is important, for paper speeds from 2 to 8 inches per second, that the direct rays of the lamp 13 should not strike the recording paper 3 nearer than approximately one inch below the amber window 12, as seen in FIG. 1. At lower paper speeds the distance may be less than one inch. In this region approximately one inch from the amber window, the recording paper should be exposed only to ambient or indirect light containing a low intensity of radiations to which the paper is particularly sensitive. At very high paper transport speeds, the interval may desirably be increased to about 2 or 3 inches. The so-called black light from lamp 15 should not strike the paper 3 until the latter has been exposed to ambient or indirect light, and additionally, has received the full intensity of the white light from lamp 14.

With this latensifier arrangement, the ambient light and the cool white light from lamp 14 serve to expose the recording paper or material, for a short time, to a low intensity state of radiation. Such exposure has been found to inactivate the original recording sensitivity of the recording paper so as thereafter to permit rapid forced latensification by high intensity ultra-violet radiation from the black light from lamp 15. Thus, a high intensity latensifying radiation defining the same wavelengths to which the recording paper is sensitive for recording the deflections of the galvanometer beams effectively may be used for latensification of the latent recorded images or traces, with a minimum of fogging. The presence of visible light in the wavelength band from 5000 A. to 7000 A. in the cool white light is useful for the purpose of viewing the record.

By way of example and not limitation, one form of recording paper 3 which has been found to be particularly useful in the practice of the present invention is that described in U.S. patent application Serial No. 93,289, filed by Troy A. Scott on March 2, 1961, and assigned to the same assignee of the present invention. This form of recording paper is sold by the Heiland Division of the said assignee, and is identified as its part number A–304796.

Other recording papers which may also be used to advantage in the practice of this invention are those made and sold by Eastman-Kodak Company and identified as its Kind 1591 and Kind 1592, and that made and sold by E. I. du Pont de Nemours & Company and identified as its Lino-Writ 5.

The print-out papers designated above have spectral sensitivities between 3000 A. and 5000 A. However, the wavelengths between 3000 A. and 4000 A. are most effective in producing traces, in desensitizing the background at low intensities, and in latensifying latent images. While the wavelengths between 4000 A. and 5000 A. also contribute to these functions, they do so in a less efficient manner. The presence or absence of wavelengths from 5000 A. to 20,000 A. during any portion of the rapid latensification procedures herein described produces no observable or significant effects. These wavelengths do not contribute to desensitization or latensification and when present, the wavelengths between 5000 A. and 7000 A. are useful only in viewing the record. Print-out papers which are desensitized by a low intensity light are found also to have an extreme reciprocity failure at low intensities.

Using the latensifier method and apparatus, as described above, in combination with recording paper of the type described, it has been found that traces appear well within a fraction of a second at paper speeds in excess of 8 inches per second at any resolvable frequency, and an envelope at non-resolvable frequencies.

While the latensifier lamp 13 has been illustrated as showing the cool white light tube 14 and the black light tube 15 as associated with the same reflector, it will be apparent to those skilled in the art that, if desired, each of the fluorescent tubes 14 and 15 may be mounted in association with a separate and individual reflector, and arranged to provide a desired spacing or separation thereof along the length of recording paper as it moves downwardly along the front face 4 of the oscillograph.

Figure 2:
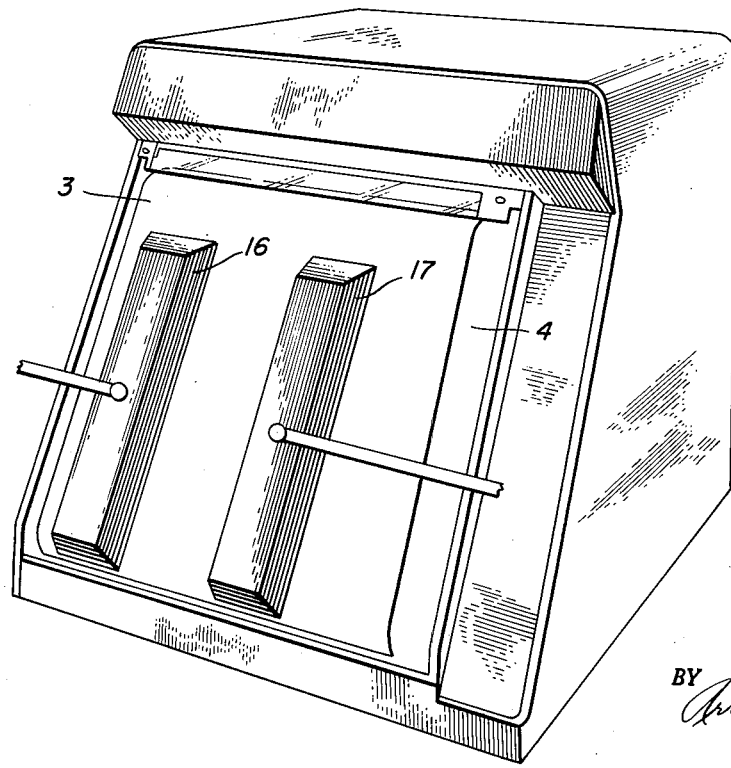
FIG. 2 illustrates a modified latensifier arrangement which may be employed with an oscillograph such as shown in FIG. 1.

In the modified oscillograph latensifier arrangement illustrated in FIG. 2, two latensifier lamps 16 and 17, each of which may be identical to the lamp 13 shown in FIG. 1, and contains two black light tubes 15, are arranged side-by-side in front of the exposed longitudinal section of the recording paper 3 with the axes of the fluorescent tubes parallel to the plane of the recording paper 3 in that exposed region. As in the arrangement of FIG. 1, it is important that the direct rays of the lamps 16 and 17 should not strike the paper nearer than about one inch below the amber window 12. In the region between the lower edge of the amber window 12 and the position at which these direct rays from the lamps 16 and 17 strike the paper, the paper should be exposed to ambient or indirect light. In some cases, it may be desirable to supplement the radiation striking this intermediate region by cool white light such as provided, for example, by the latensifier fluorescent tube 14 of FIG. 1. In other cases, ordinary incandescent lamps emitting a low intensity of ultraviolet light could be used for supplementing the ambient light. At faster paper transport speeds, the interval between the lower edge of the amber window 12 and the line or region at which rays from the lamps 16 and 17 strike the paper may be increased to 2 or 3 inches.

Figure 3:
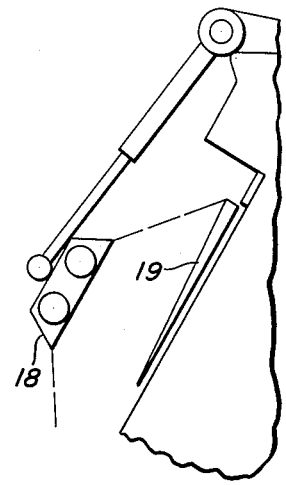
FIG. 3 is a fragmentary view of the front of an oscillograph such as shown in FIG. 1, illustrating another latensifier arrangement which may be employed in accordance with the present invention.

FIG. 3 illustrates a modified latensifier arrangement according to the present invention in which the latensifying radiation is derived from a latensifier lamp 18 which desirably may include only fluorescent tubes providing black light such as the fluorescent tube 15 shown in FIG. 1. As shown in FIG. 3, a graduated light filter or wedge 19 is provided at the front 4 of the oscillograph immediately below the amber colored window 12. The filter 19 is rectangular in shape and extends completely across the width of the recording paper 3 and for a suitable distance along the length of the recording paper as the latter travels downwardly along the front face of the oscillograph. By way of example and not limitation, it is contemplated that the width of this filter may be one of two inches and so arranged that the intensity of radiation to which the paper is particularly sensitive passing through the filter and striking the recording paper progressively increases as the paper moves downwardly along the front of the oscillograph. With this arrangement, it is evident that the recording paper is exposed to a low intensity state of radiation for the short time interval during which the recording paper is shielded by the filter 19, and is thereafter directly exposed to the high intensity latensifying radiations emanating from the latensifier lamp 18 as the paper passes out from under the filter 19 and on downwardly along the front of the oscillograph.

If desired, the latensifier lamp 18 in the modification of FIG. 3 may include a cool white fluorescent tube corresponding to the tube 14 in FIG. 1 for supplementing the latensifying radiation to which the recording paper 3 is exposed.

While FIGURE 3 illustrates a method for providing progressively increasing intensities of radiation utilizing only fluorescent tubes providing black light such as the fluorescent tube 15 shown in FIG. 1, it will be apparent to those skilled in the art that, if desired, the same effect can be produced without a filter and by substituting baffles, reflectors, or other known types of light attenuators for the filter.

It will be apparent from the foregoing description that there has been provided, according to the present invention, a novel apparatus for effecting rapid trace latensification for providing extremely fast access to recorded information. This latensifying apparatus is operative rapidly to produce an image or trace of phenomena occurring at either low or high frequency, thereby making the image or trace quickly visible and usable in full view and under control of the operator and giving to the operator quick access to the recorded information in a period of time significantly shorter than that obtainable by conventional processing techniques.

Subject matter disclosed but not claimed herein is disclosed and claimed in my copending divisional application, Serial No. 444,480, filed on February 24, 1965.

What is claimed is:

1. Apparatus for recording the time-variations of phenomena under observation comprising a source of radiation principally in the invisible portion of the spectrum, a recording material coated with an emulsion primarily responsive to such radiations, means operative to focus radiations from said source into a spot of high intensity on said recording material and to move said spot of radiation along a path on said recording material such that the spot position is representative of the value of the phenomena under observation, first means operative to expose said recording material for a short time to a low intensity state of radiation having wavelengths to which said recording material is primarily responsive, second means operative to expose said recording material to a high intensity latensifying radiation defining substantially the same wavelengths last referred to, and means operative to move said recording material relatively to said radiation spot to produce a latent image or trace of said spot on said recording material, and thereafter to move said recording material with said latent image or trace thereon successively past said first and second exposure means, thereby to produce rapid forced latensification of said image or trace without fogging.

2. Apparatus as specified in claim 1 in which the first mentioned means includes a galvanometer having a coil responsive to said time-variations and a mirror movable with said coil to reflect said radiations and to cause them to move as a pointer with the movements of said coil, and optical mechanism associated with said mirror to focus said reflected radiations to form said spot.

3. Apparatus as specified in claim 1 in which the range of wavelengths derived from said first and second exposure means for latensifying said latent image or trace produced by said radiation spot is between 3000 A. and 4000 A.

4. Apparatus as specified in claim 1 in which said first exposure means includes a fluorescent lamp producing cool white light and said second exposure means includes a fluorescent lamp producing black light.

5. Apparatus for recording the time-variations of phenomena under observation comprising a source of radiation principally in the invisible portion of the spectrum, a recording material coated with an emulsion primarily responsive to such radiations, means operative to focus radiations from said source into a spot of high intensity on said recording material and to move said spot of radiation along a path on said recording material such that the spot position is representative of the value of the phenomena under observation, thereby to produce a latent image or trace on said recording material corresponding to the variations in said spot position thereon, exposure means providing a high intensity latensifying radiation defining wavelengths to which said recording material is primarily responsive, means operative to move said recording material with said latent image or trace thereon past said exposure means, and filter means associated with said recording material and said exposure means and operative to effect an initial brief exposure of said recording material to a low intensity state of said latensifying radiation and thereafter to a high intensity state of said latensifying radiation, said low and high intensity states of radiation each defining substantially the same wavelengths, thereby to produce rapid forced latensification of said image or trace without fogging.

6. Apparatus for recording the time-variations of phenomena under observation comprising a source of radiation principally in the blue and ultra-violet portion of the spectrum, a recording material coated with an emulsion primarily responsive to such radiations, means operative to focus radiations from said source into a spot of high intensity on said recording material and to move said spot of radiation along a path on said recording material such that the spot position is representative of the value of the phenomena under observation, first operative to expose said recording material for a short time to a low intensity state of radiation having wavelengths to which said recording material is primarily responsive, second means operative to expose said recording material to a high intensity latensifying radiation defining substantially the same wavelengths last referred to, and means operative to move said recording material relatively to said radiation spot to produce a latent image or trace of said spot on said recording material, and thereafter to move said recording material with said latent image or trace thereon successively past said first and second exposure means, thereby to produce rapid forced latensification of said image or trace without fogging.

7. Apparatus for recording comprising a source of radiation including wavelengths between 3000 A. and 5000 A., a recording material coated with an emulsion primarily responsive to such radiations, means operative to form radiations from said source into an image of high intensity on said recording material to produce a latent trace of said image on said recording material, means to latensify said latent trace comprising a secondary exposure means operative first to expose said recording material bearing said trace for a short time to a low intensity state of radiation including wavelengths in the range between 3000 A. and 5000 A. and thereafter to expose said recording material to a high intensity latensifying radiation defining substantially the same wavelengths, and means operative to conduct said recording material in succession past the first mentioned means and past said latensifying means, in the order specified.

8. Apparatus for latensifying images which have been recorded on print-out material comprising first means to expose said material bearing said images initially and briefly to a low intensity state of radiation including wavelengths in the range of initial recording sensitivity of said material, second means thereafter to expose said material to a high intensity radiation defining substantially the same wavelengths, and means to conduct said material bearing said images in succession and in the order specified past said first and said second means.

9. Apparatus as specified in claim 8 in which said first means includes a source of cool white light and said second means includes a source of black light.

References Cited by the Examiner
UNITED STATES PATENTS

| | | | |
|---|---|---|---|
| 2,580,427 | 1/1952 | Heiland | 346—108 |
| 3,048,846 | 8/1962 | Martin | 346—1 |
| 3,050,731 | 8/1962 | Usdin | 346—1 |
| 3,063,350 | 11/1962 | Le Massena | 346—109 X |
| 3,064,260 | 11/1962 | Heiland | 346—109 |
| 3,066,299 | 11/1962 | Kampf | 346—109 |
| 3,143,940 | 8/1964 | Brown et al. | 346—109 |
| 3,144,332 | 8/1964 | Brown et al. | 346—109 |

LEYLAND M. MARTIN, *Primary Examiner.*

JULIA E. COINER, LEO SMILOW, *Examiners.*